United States Patent [19]

Nossen

[11] 4,291,275

[45] Sep. 22, 1981

[54] FREQUENCY DEMODULATION SYSTEM

[75] Inventor: Edward J. Nossen, Cherry Hill, N.J.

[73] Assignee: RCA Corporation, New York, N.Y.

[21] Appl. No.: 48,167

[22] Filed: Jun. 13, 1979

[51] Int. Cl.³ .............................................. H03D 3/00
[52] U.S. Cl. ...................................... 329/112; 375/89
[58] Field of Search ............... 329/126, 110, 112, 128; 375/79, 91, 89, 88

[56] References Cited

U.S. PATENT DOCUMENTS

| | | | |
|---|---|---|---|
| 3,047,660 | 7/1962 | Costas | 178/88 |
| 3,189,826 | 6/1965 | Mitchell et al. | 325/418 |
| 3,293,551 | 12/1966 | Ehrich | 375/91 |
| 3,353,102 | 11/1967 | Meyers et al. | 178/88 |
| 3,383,600 | 5/1968 | Calfee | 325/320 |
| 3,660,601 | 5/1972 | Dobson | 178/88 |
| 3,674,934 | 7/1972 | Gooding et al. | 178/88 |
| 3,743,775 | 7/1973 | Hutchinson et al. | 178/88 |
| 3,792,364 | 2/1974 | Ananias | 329/50 |
| 3,921,075 | 11/1975 | Denny | 325/320 |
| 3,925,614 | 12/1975 | Bousmar | 178/88 |
| 4,054,842 | 10/1977 | Elliott | 375/91 |

Primary Examiner—David K. Moore
Attorney, Agent, or Firm—Samuel Cohen; Robert L. Troike; Donald W. Phillion

[57] ABSTRACT

A demodulator for demodulating an encoded signal comprising first and second predetermined patterns of contiguous signal segments of frequencies $f_1$ and $f_2$. A first signal processing means comprises first correlation means including a reference signal which is correlative with the signal segments of frequency $f_1$ of said first and second patterns to produce a first and second output signals when correlation occurs. A second signal processing means comprising second correlation means including a reference signal which is correlative with the signal segments of frequency $f_2$ of said first and second patterns to produce third and fourth output signals when correlation occurs. The said first and third output signals are combined to produce a first resultant signal indicating correlation with said first pattern of signal segments and said second and fourth output signals are combined to produce a second resultant signal indicating correlation with said second pattern of signal segments.

7 Claims, 13 Drawing Figures $N_B$ = NOISE LEVEL IN CHANNEL B $N_B - N_A = N_R$ $N_A$ = NOISE LEVEL IN CHANNEL A $N_R$

RESULTANT NOISE LEVEL AT OUTPUT OF DIFFERENCE AMPLIFIER

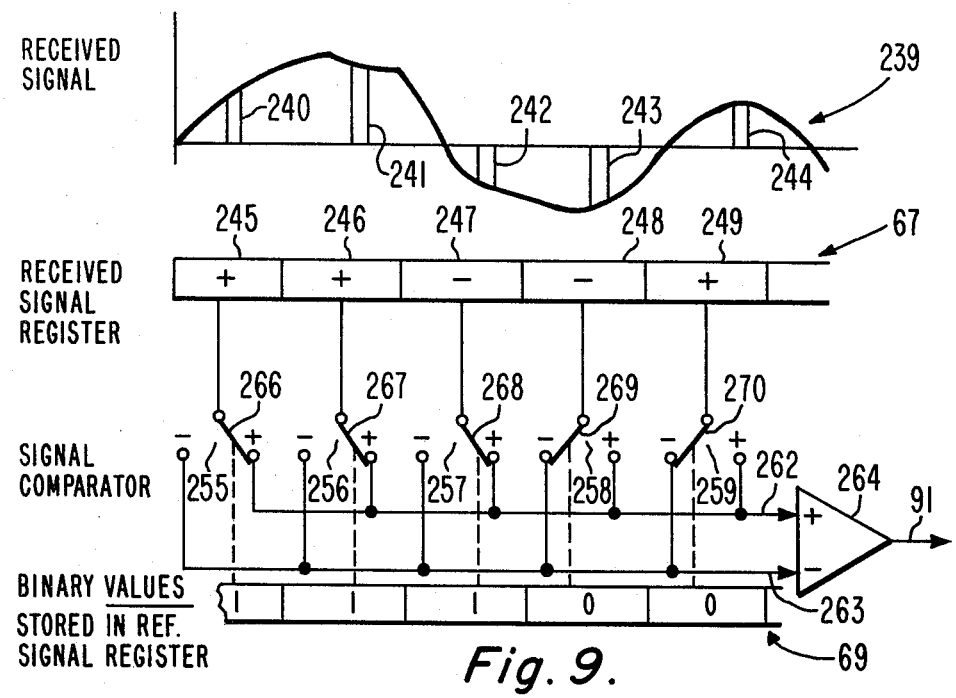
Fig. 9.
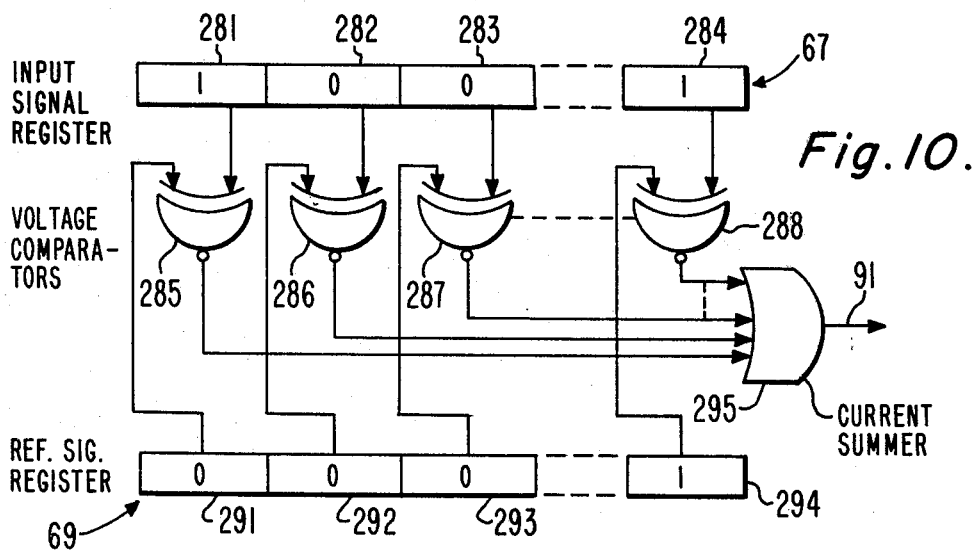
Fig. 10.
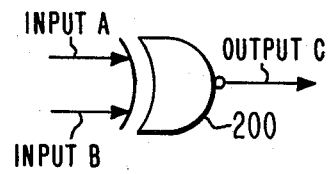
Fig. 11.
Fig. 12.

FREQUENCY DEMODULATION SYSTEM

The invention described herein was made under a contract with the Department of the Navy.

This invention relates generally to frequency demodulation detection systems and more particularly, to a system for detecting frequency shift keyed (FSK) modulation employing correlation means for improved dynamic range of performance.

In a conventional FSK demodulator there is usually an upper channel comprising a first filter tuned to the upper frequency $f_0 + \Delta f$ followed by detection means and a lower channel comprising a second filter tuned to the lower frequency $f_0 - \Delta f$ followed by detection means, with both filters being responsive to the supplied FSK signal. The outputs of the two detector means are then usually combined in a difference amplifier. More specifically, the upper channel produces a first signal of one polarity and the lower channel produces a signal of the other polarity. The absolute magnitudes of the two signals are added together in the difference amplifier whose output is then supplied to a low pass filter. The low pass filter outputs a pulse whose polarity indicates the reception of a mark or a space.

Typically in FSK demodulators the reception of a mark produces a positive voltage in the upper, higher frequency channel and the reception of a space produces a positive voltage in the lower channel so that the output of the difference amplifier changes polarity each time the incoming signal changes from a mark to a space or from a space to a mark. However, the presence of a strong noise signal falling in the frequency pass band of the upper channel might cause the output of the upper channel detector to be a positive voltage of sufficient magnitude to completely override a positive voltage outputted from the lower channel, even though a space is being received. In such case, the output of the difference amplifier will not change polarity when the received signal changes from a space to a mark or from a mark to a space, and received data will be lost.

A primary purpose of the present invention is to substantially increase the sensitivity of the frequency modulation detection system so that a received signal of much lower amplitude can be detected than with prior art devices, with respect to a given noise level.

In accordance with one form of the invention, there is provided a means for demodulating an encoded signal comprising at least one pattern of successive signal segments of frequencies $f_1$ and $f_2$. A first signal processing means comprising a first correlation means correlative with the signal segments of frequency $f_1$, produces a first output signal when correlation with said signal segments of frequency $f_1$ occurs. A second signal processing means comprising second correlation means correlative with the signal segments of frequency $f_2$ of said pattern to produce a second output signal when correlation with said signal segments of frequency $f_2$ occurs. Further means are provided for combining the first and second output signals to produce a resultant output signal indicating correlation with said at least one pattern of signal segments.

Figure 1:
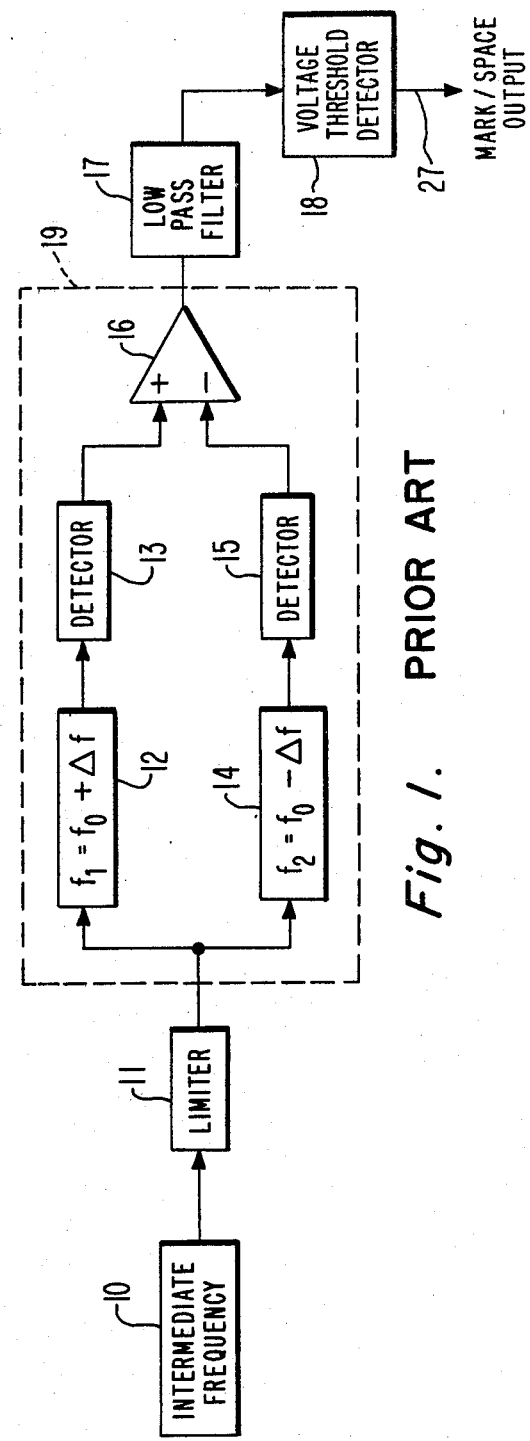
FIG. 1 is a block diagram of a conventional prior art FSK modulation detection system.
Figure 2:
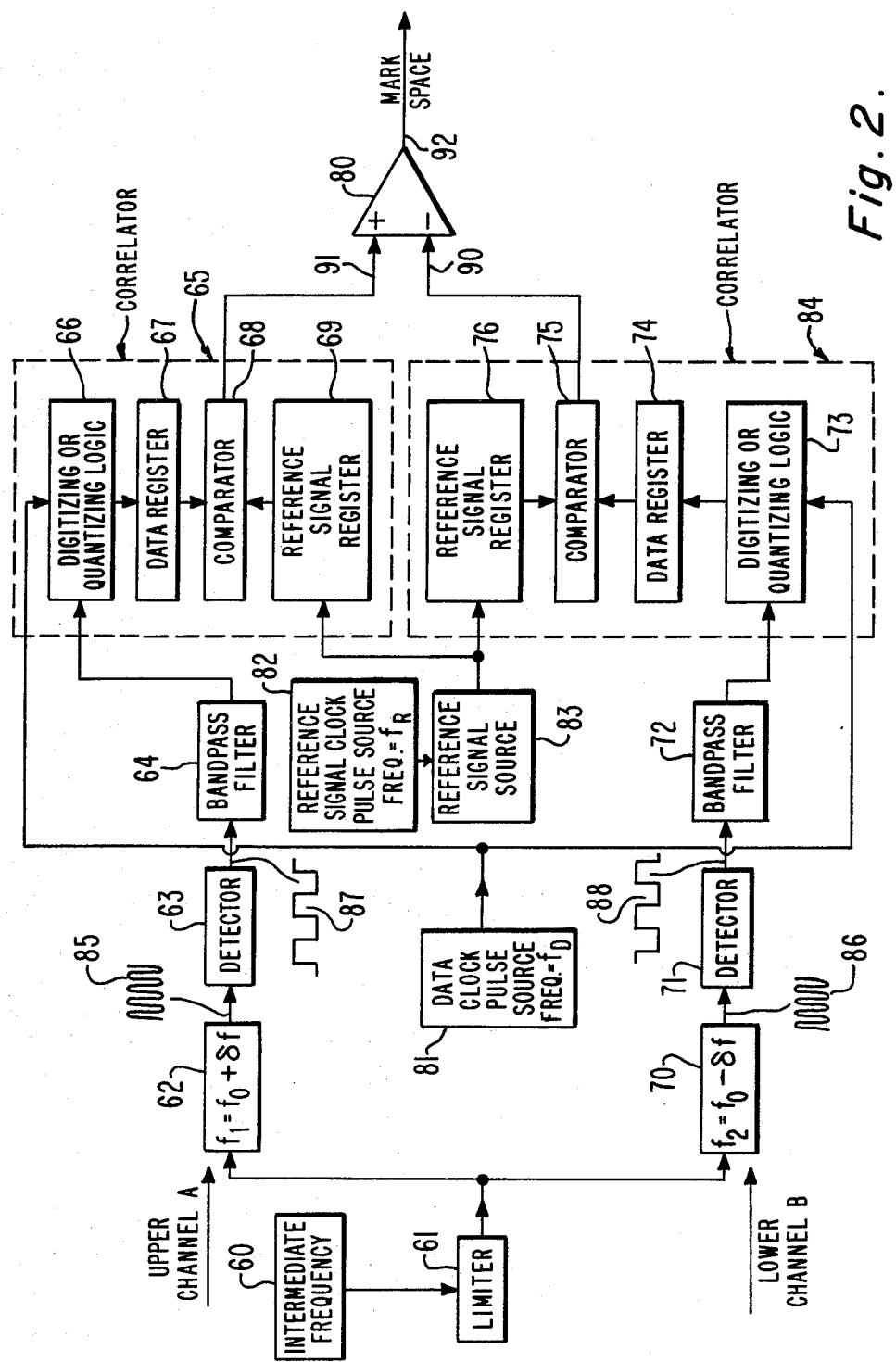
FIG. 2 is a block diagram of one form of the invention employing first and second correlator means each responsive to complementary patterns of input signal.
Figure 6:
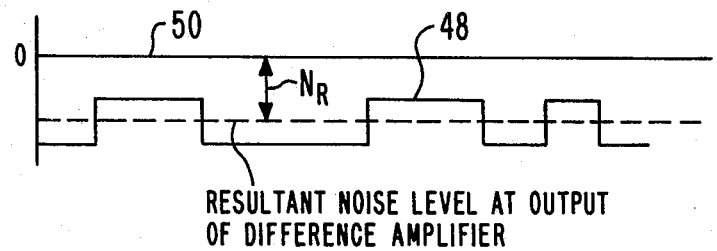
Figure 7:
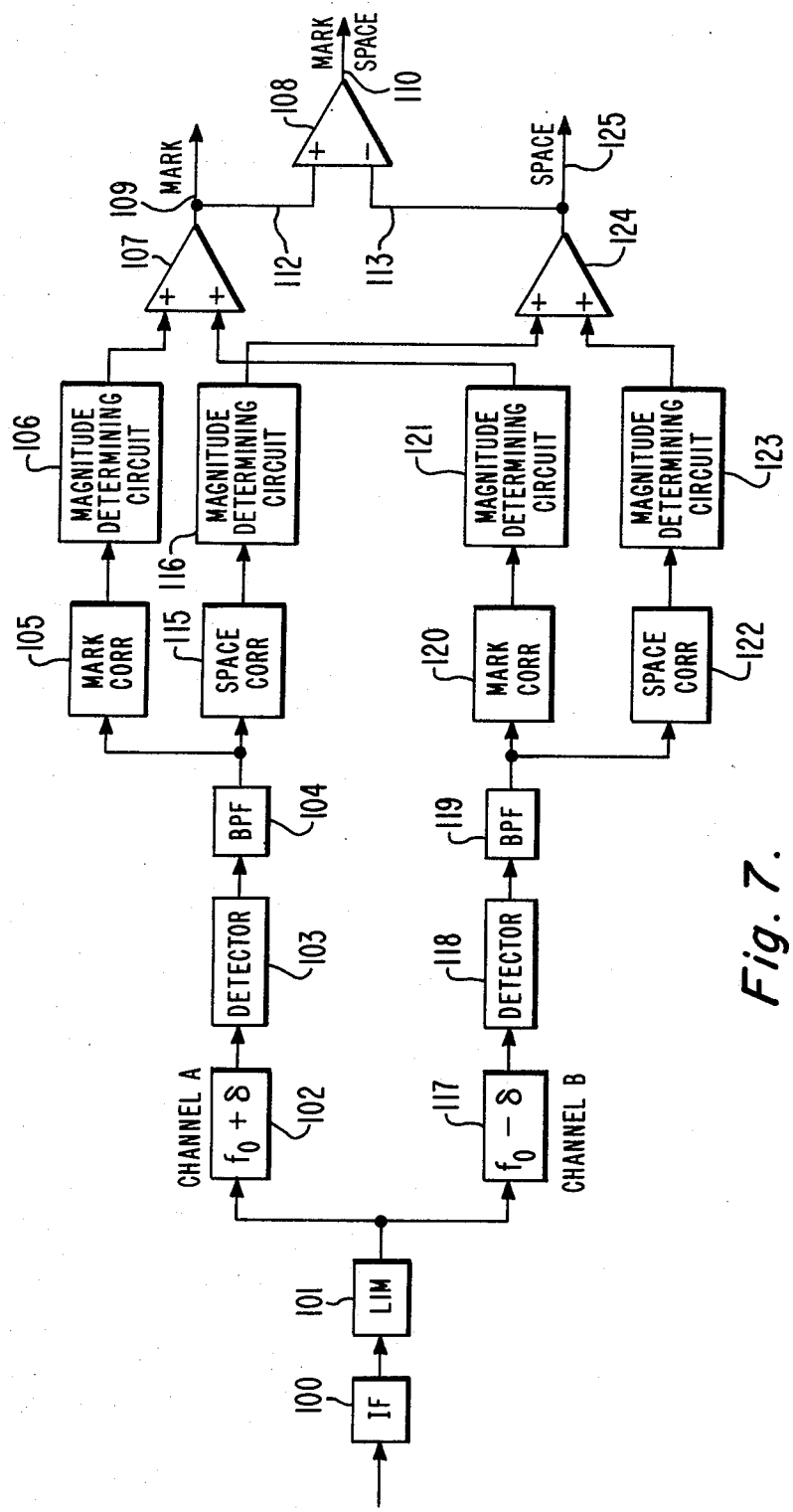
Figure 8:
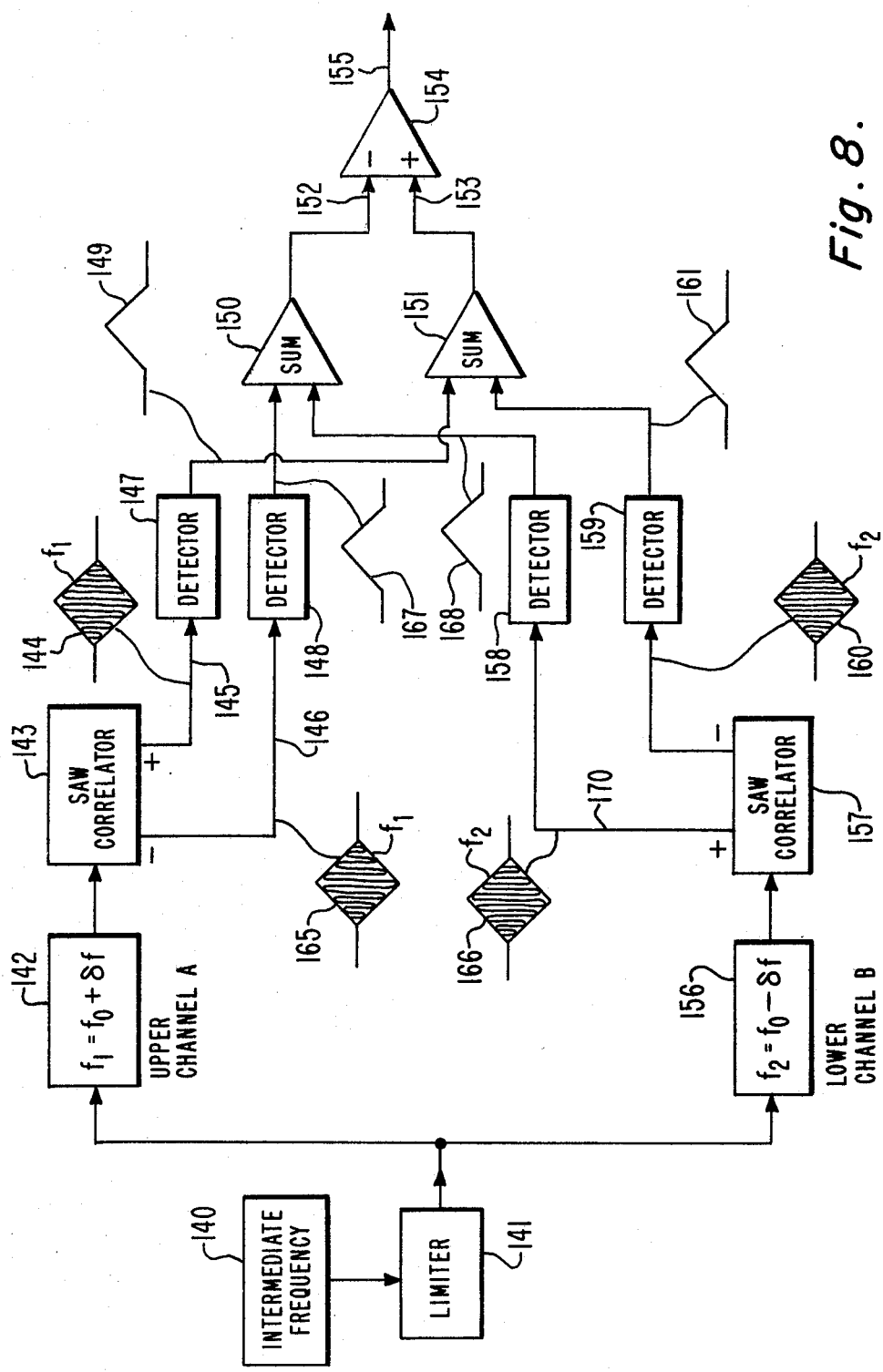

FIG. 6 is a waveform showing the combined effects of FIGS. 1 and 2 of noise in the upper and lower channels, and illustrating that the signal can be lost if no zero crossovers defining marks and spaces occur; FIG. 7 is a block diagram of another form of the invention in which marks and spaces are identified by completely different patterns of signal segments rather than by complementary patterns as shown in FIG. 2;

FIG. 8 is a block diagram of still another form of the invention employing surface acoustic wave (SAW) devices as correlators which respond to bursts of intermediate frequency signals outputted from the upper and lower channel input filters;

FIG. 9 shows a correlator which compares a binary representation of a reference signal with amplitude samplings of an input signal;

FIG. 10 shows a correlator which compares the binary representations of both the reference and input signals;

FIG. 11 shows a NOR gate; and

FIG. 12 shows a truth table of the output signals resulting from the comparisons of bit positions in the correlators of FIGS. 9 and 10.

In FIG. 1 an FSK signal at intermediate frequency (IF) is supplied from IF filter 10 to limiter 11, the output of which consists of a series of equal amplitude signal segments of frequency $f_1$ or frequency $f_2$. The signal segments of frequency $f_1$ are identified by reference characters 20, 21 and 22 in FIG. 1a and those of frequency $f_2$ are identified by reference characters 23, 24 and 25, and all of which have a length which is an integral multiple of a code chip. For purposes of discussion, assume that the signal segment 20 is one code chip in length, with N code chips forming one binary 1 or 0.

Figure 3:
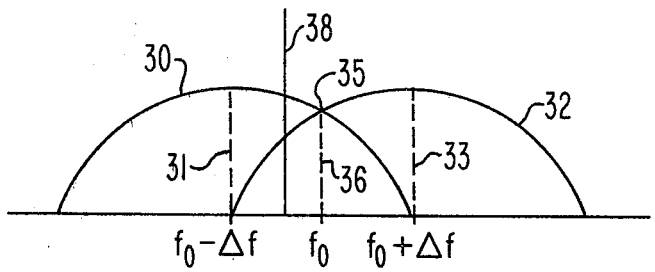
FIG. 3 shows the filter characteristics of the upper and lower channels of the structure of FIGS. 1 and 2 in response to the input signal.

The $f_1$ signal segments 20, 21 and 22 are passed through the band pass filter 12 (FIG. 1) whose frequency characteristics are represented by the frequency response curve 32 of FIG. 3 having a center frequency $f_0 + \Delta f$ and identified by dotted line 33.

The lower $f_2$ frequency segments 23, 24 and 25 are passed through filter 14 (FIG. 1) whose frequency response characteristics are represented by curve 30 of FIG. 3 with a nominal center frequency $f_0 - \Delta f$ represented by dotted line 31. The nominal center frequency $f_0$ is represented by the crossover points 35 of the two frequency response curves 30, 32 and is further represented by dotted line 36.

In the absence of a large noise signal 38, the output of filters 12 and 14 will be detected effectively by detectors 13 and 15 of FIG. 1 and then supplied as dc voltages through difference amplifier 16 which functions to combine the two signals supplied thereto and supply the resultant output through low pass filter 17 to a voltage threshold decision circuit 18, which outputs on terminal 27 a positive pulse if a mark has been received and a negative pulse if a space has been received.

Figure 1A:
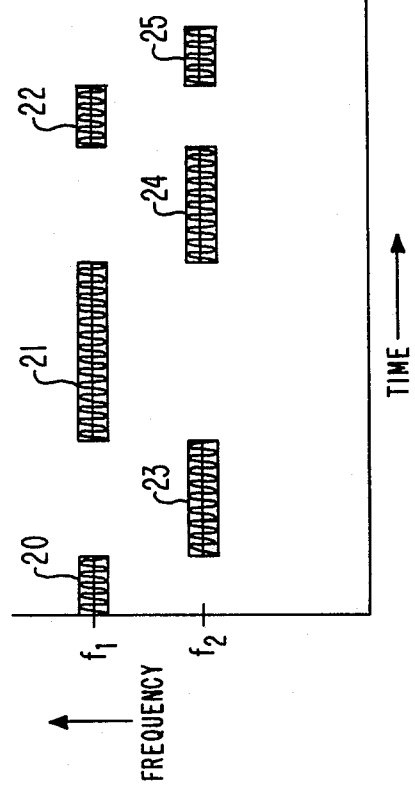
FIG. 1a is a drawing showing signal segments produced in the systems of FIGS. 1 and 2.

The structure within block 19 is commonly known as a discriminator when filters 12 and 14 have appropriate responses. When a data bit is represented by many code chips, the pattern of signal segments shown in FIG. 1a represents a mark. A space is then represented by the same pattern of signal segments except that the frequencies are interchanged. Thus, signal segments 20, 21 and 22 would be of frequency $f_2$ and signal segments 23, 24 and 25 would be of frequency $f_1$. The polarity of the output signal of detector 15 is then also reversed from that of detector 13.

The segments of a strong noise signal such as noise signal 38 of FIG. 3 produces results which make it impossible to receive the intelligence of either spaces or marks as will be discussed below in connection with FIGS. 4, 5 and 6.

Figure 4:
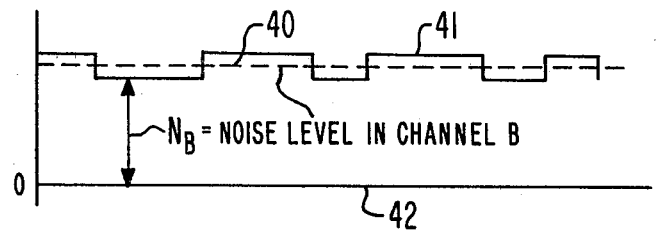
FIGS. 4 and 5 show the effects in the structures of FIGS. 1, 2 and 7 of a large noise signal located within the lower pass band frequency spectrum.

In FIG. 4 the noise level $N_B$ created in the lower channel B of FIG. 1 is the result of noise signal 38 of FIG. 3 and is shown to be of sufficient magnitude to prevent the changes in level of the detected output signal 41 from crossing the zero voltage threshold 42.

Figure 5:
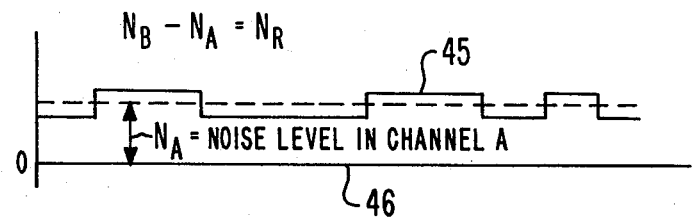

Similarly, as shown in FIG. 5, the effect of the noise signal 38 of FIG. 3 on the upper channel A of FIG. 1 is of sufficient magnitude to prevent the two-level output signal 45 from detector 15 from crossing the zero voltage threshold level 46. When the two signals of FIGS. 4 and 5 are combined in difference amplifier 16, with the noise $N_B$ of channel B being inverted thereby, the results thereof are shown in FIG. 6. Specifically, the resultant noise signal $N_R$ is the difference between the noise levels of FIGS. 4 and 5 but is still of sufficient magnitude to prevent the combined two-level signal 48 from crossing the zero voltage threshold level 50. Therefore, the output of difference amplifier 16 (FIG. 1) will have no zero voltage crossovers and accordingly, little intelligence is passed through low pass filter 17 to threshold detector 18. The waveforms representing the spaces and marks are generally lost due to the lack of zero voltage crossovers at the output of difference amplifier 16, which are needed by the mark/space decision circuit 18.

FIG. 2 shows a block diagram of a preferred form of the invention. The received signal at intermediate frequency (IF) is supplied from source 60 through limiter 61 to produce a pattern of signal segments 20-25 as shown in FIG. 1a with segments 20-22 having a frequency $f_1$ and segments 23-25 having a frequency $f_2$, and with the total pattern of signal segments representing a mark.

Consider first the operation of the upper channel A of FIG. 2 which comprises filter 62, detector 63, band pass filter 64 and correlator 65, the output of which is supplied through difference amplifier 80. The filter 62 passes the signal segment of frequency $f_1$ to detector 63 which outputs a square wave signal such as 87 (shown without the noise which is ordinarily present) in accordance with the pattern of bursts of signal segments of frequency $f_1$. The waveform 87 illustrates only one such burst of frequency $f_1$, it being understood that it is intended to represent a pattern of bursts. The same holds for waveform 88 in channel B.

The output of detector 63 is supplied to band pass filter 64 to remove low frequency noise and higher order (harmonic) frequency components of two-level waveform 87, which noise and harmonic components are not, in fact, shown in FIG. 2. Such filtered output from band pass filter 64 is then supplied to correlator 65 which, in turn, can be comprised of either a digitizing or quantizing logic means 66, a data register 67, a reference signal register 69, and a comparator 68 which compares the contents of data register 67 with the digitized contents of the reference signal register 69. The contents of register 69, which is a digitized reference signal, is entered into register 69 prior to the entry of the received input signal into data register 67. When coincidence occurs, comparator 68 outputs a signal to the positive input of difference amplifier 80.

The data registers 67 and 74 and the reference registers 69 and 76 are shift registers and typically might have 512 code chip positions, which collectively represent one binary 1 (a mark) or one binary 0 (a space). However, one code chip can occupy more than one register position by increasing the register capacity and increasing the sampling and clocking rate of the input signal into the input registers. The capacity of the reference registers would also have to be increased by a corresponding amount.

Assuming one code chip per register position, however, the data clock pulses supplied from source 81 clocks input signal samples into data registers 67 and 74 (through digitizing and quantizing logic blocks 66 and 73 (at a rate $f_D$ which will fill the registers 67 and 74 with 512 code chips during one binary period T. Thus, the following relation exists:

$$T = 512 \times 1/f_D$$

The reference signals are supplied to reference signal register 69 and 76 prior to the supplying of the input signal to data registers 67 and 74, by means of reference signal source 83 which generates the code chips of the digitized reference signal at a rate $f_R$ by means of clock pulses from clock pulse source 82. The clock pulse rate $f_R$ need have no particular relation with the clock pulse rate $f_D$.

Before continuing with a discussion of FIG. 2, a more detailed discussion of correlators, as shown in FIGS. 9-12 will be discussed in order to provide a better background for understanding FIGS. 2, 3 and 7.

FIG. 9 shows a correlator with the logic 66 of FIG. 2 functioning as a quantizer which samples the input signal 239 from band pass filter 64 of FIG. 2. The current generated in each correlator code chip position (code chip positions 245-249 of data register 67) is proportional to the amplitude of the input signal samples 240-244 which are generated sequentially by quantizer 66 (FIG. 2) at the rate $f_D$ of the clock pulses from pulse source 81. Specifically, the amplitude samples 240-244 of the shown portion of the received signal 239 from band pass filter 64 are stored, respectively, in bit positions 245-249 of the received input signal (data) register 67, which can be a charge coupled device, for example.

The bits (code chips) previously stored in the corresponding bit positions of reference signal register 69 are arbitrarily shown as being a binary sequence 11100 and are represented by, and physically controlled by, the state of the switches 255-259, respectively, which can be electronic switches. Specifically, binary 1's, in effect, close their associated switch arms upon the positive bus bar 262 and binary 0's close their associated switch arms upon the negative or inverting bus bar 263. Coincidence or correlation occurs when the polarity of the value stored in the chip position of the received signal register 67 matches the binary value stored in the reference signal register 69. Thus, switch arms 266 and 267, closed upon positive bus bar 262 to conduct positive currents from bit positions 245 and 246 of the received input signal register 67, constitute instances of coincidence. Arm 269 conducts a negative current from bit position 248 of input signal register 67 to the negative or inverting bus bar 263, which inverts said negative current to produce a positive current on the output terminal 91 (corresponding to lead 91 of FIG. 2) of device 264, another example of coincidence.

Arms 268 and 270, however, connect negative and positive currents from bit positions 247 and 249 of register 67 to positive and negative bus bars 262 and 263, respectively, both examples of non-coincidence. The negative current from bit position 247 substracts from the signal on output terminal 91 of device 264. Also the positive current from bit position 249 subtracts from the output signal of device 264, since it is inverted thereby.

When employing the correlator of FIGS. 10, 11 and 12, the logic 66 of FIG. 2 functions as a digitizer. Specifically, FIGS. 10, 11 and 12 show means for comparing the binary representation of the reference signal with a digitized binary input signal, i.e., an input signal represented by binary 1's and 0's depending on whether the sampled portion of the input signal is greater or less than a reference voltage, such as ground potential.

In FIG. 10 the input signal register 67 contains a binary 100--1 in bit (code chip) positions 281-284, respectively. The reference signal register 69 contains a binary 000--1 in bit positions 291-294, respectively. Coincidence exists between bit positions 282, 283 and 284 of input signal register 67 and bit positions 292, 293 and 294 of reference signal register 69, and non-coincidence exists between bit position 281 of input signal register 67 and bit position 291 of reference signal register 69. The exclusive NOR gates 285-288 respond to various combinations of binary inputs as shown in the truth table of FIG. 12. For purposes of interpreting the truth table of FIG. 12, an exclusive NOR gate 200 is shown separately in FIG. 11 with its two input terminals identified as Input A and Input B and its output terminal as Output C. It is evident that the output signals of exclusive NOR gates 285-288 will be binary 1's (a positive voltage) if coincident signals are supplied to their two input terminals, and will be a binary 0 (a negative voltage) if non-coincident signals are supplied to their two input terminals.

The current signal summer circuit 295 sums together the output signals from all of the exclusive NOR gates 285-288, (subtracting the negative currents from the positive currents) with the resulting current appearing on output terminal 91, which corresponds to output terminal 91 of FIG. 2.

Returning again to a more general discussion of FIG. 2, the incoming signal from the band pass filter 64 is, in substance, a two-level analog signal, assuming no noise. The digitizing or quantizing logic 66 samples the signal from band pass filter 64 at a sampling rate $f_D$ determined by the output from data clock pulse source 81 and enters such samples serially into data register 67. The register 67 can be a binary register or an analog register (as in charge coupled devices).

The reference signal register 69 has been previously supplied with a digitized reference signal comprised of binary 1's and 0's from reference signal source 83 under control of reference clock pulse source 82 which need not be the same frequency as the output from clock pulse source 81. As the quantized or digitized data passes through data register 67, it is continuously compared with the digitized reference signal in register 67 in comparator 68. When correlation occurs, an output pulse is supplied to the positive input of difference amplifier 80.

Because correlator 65 is, in fact, a matched filter, it will provide a larger signal-to-noise ratio than would be provided by an unmatched filter 17 as is shown in the prior art structure of FIG. 1. Further enhancement of the signal-to-noise ratio is obtained in the structure of FIG. 2 inasmuch as both detection and correlation of signal segments of frequency $f_1$ is effected separately from the detection and correlation of the signal segments of frequency $f_2$, thereby obtaining a high degree of isolation between the signal segments of frequency $f_1$ and those of frequency $f_2$ with respect to noise.

The signal elements 23, 24 and 25 of FIG. 1a are passed through the lower channel filter 70 of FIG. 2 which has a frequency response curve 30 of FIG. 3. The output of filter 70 is a series of bursts of IF signal of constant amplitude (in a noiseless environment) in accordance with the time relationship shown by the signal segments 23, 24 and 25 of FIG. 1a.

Detector 71 responds to the series of burst of IF frequency to produce the envelope thereof represented by waveform 88 of FIG. 2, which is supplied to the band pass filter 72 where spurs of low frequency noise and higher order harmonics are removed. The output of band pass filter 72 is then either digitized or quantized by the logic in block 73 and supplied as quantized pulses or binary 1's and 0's to data register 74 in a serial manner. The reference signal generated by reference signal source 83 under control of reference signal clock pulse source 82 has previously been supplied into reference signal register 76 and is a duplicate of the expected signal to be received in data register 74.

Reference signal register 69 and 76 are shown as two distinct registers, although, in fact, one register could be employed to serve both correlators 65 and 83.

The comparator 75 compares the stream of data incoming into the data register 74 and when correlation occurs with the reference signal stored in register 76, an output signal is supplied from comparator 75 to the negative input of differential amplifier 80. The difference amplifier 80 responds to the two signals supplied to the positive and negative inputs thereof to produce an output signal having a magnitude twice the input of either of the two inputs thereto. Such output signal from difference amplifier 80 is of a first polarity, usually positive, for a mark, and of a negative polarity in response to the reception of a space.

A received space can consist of a pattern of signal segments $f_1$ and $f_2$ similar to that of a mark except that the frequency of the segments are interchanged to form a complementary pattern as discussed above. Thus, to represent a space, the signal segments 20, 21 and 22 of FIG. 1a are of frequency $f_2$ and signal segments 23, 24 and 25 are of frequency $f_1$.

The filter 70 receives the signal segments 20, 21 and 22, assumed now to be of frequency $f_2$, to produce an output from detector 71 which is the same as waveform 88 but inverted and which is, in fact, similar to the output waveform 87 from detector 63 when a mark is being received by the system. The output of detector 71 is supplied through band pass filter 72 to remove noise and higher order harmonics and then is digitized or quantized in block 73 and supplied serially to data register 74 where it is compared with the reference signal stored in register 76. In the event the system is receiving a space, as currently being assumed, the output of comparator 75 will be a positive voltage which is inverted by difference amplifier 80.

Similarly, signal segments 23, 24 and 25 of FIG. 1a are passed through filter 62, since they are of frequency $f_1$ when a space is being received, and will be detected by detector 63 to produce a waveform inverted with respect to waveform 87. The output of detector 63 is filtered in band pass filter 62 and then digitized or quantized in logic means 66 and supplied serially to data register 67. The data stored in register 67 is constantly compared with the reference signal stored in reference register 69, and when correlation occurs, the comparator 68 will output a negative voltage to input 91 of differential amplifier 80. Thus, the negative signal supplied to input 91 of difference amplifier 80 and the positive output supplied to input 90 of difference amplifier 80 are added together with a negative polarity, thus producing on output terminal 92 of difference amplifier 80 a negative pulse representing the reception of a space.

Referring now to FIG. 7 there is shown another form of the invention employing two patterns of signal segments, one pattern representing a mark and the other a space, but being quite different from each other rather than simply being complements.

The principal difference between the structure of FIG. 7 and that of FIG. 2 is that in FIG. 7 there is a mark correlator in both channel A and channel B and a space correlator also in both channel A and channel B. More specifically, channel A comprises mark correlator 105 which responds to signal segments of frequency $f_1$ and channel B comprises a mark correlator 120 which responds to signal segments of frequency $f_2$, when a mark is being received by the system. It is apparent in FIG. 7 that filter 102 in channel A passes signal segments of frequency $f_1$ and filter 117 of channel B passes signal segments of frequency $f_2$.

The outputs of mark correlator 105 of channel A and mark correlator 120 of channel B are supplied through absolute magnitude determining devices 106 and 121 and are then added together as positive dc voltages in summer 107 and appear on output terminal 109 thereof as a positive pulse representing the reception of a mark. Absolute magnitude determining devices 106 and 121 output positive pulses in response to either positive or negative input pulse. Thus they are called absolute magnitude determining devices.

When a space is received by the system of FIG. 7, the space correlator 115 in channel A responds to the signal segments of frequency $f_1$ and the space correlator 122 of channel B corresponds to the signal segments of frequency $f_2$. The absolute values of the outputs of space correlators 115 and 122 are determined in absolute magnitude determining devices 116 and 123 and are supplied as positive pulses to summer 124 where they are added together to produce a positive output on lead 125, representing a space.

If a single line output 110 is desired for both marks and spaces, a difference amplifier 108 can be provided. If a mark is being received by the system, the outputs of space correlators 115 and 122 consist entirely of noise which is inverted to a negative value at the input 113 of differential amplifier 108. The received mark is correlated in mark correlator 105 in channel A and mark correlator 120 in channel B and provides a positive output from summer 107 which appears at the output of differential amplifier 108 as a positive output.

When a space is being received by the system, the output of the two space correlators 115 and 122 each produce positive outputs which are added in summer 124 and then supplied to the negative input 113 of differential amplifier 108 and appears at the output thereof as a negative pulse. The signals generated in mark correlators 105 and 120 when a space is being received, consist largely of noise which are added together in summer 107 and supplied as a positive voltage to the input 112 of difference amplifier 108 in contrast to the negative voltage supplied to the negative input 113 of difference amplifier 108.

The intermediate frequency FSK signal is supplied from IF amplifier 100 through limiter 101 and then to the two filters 102 and 117 in channels A and B, respectively. The filters 104 and 119 preferably are band pass filters in order to eliminate unwanted higher harmonics as well as dc voltages.

Referring now to FIG. 8, there is shown a form of the invention employing surface acoustic wave (SAW) filter type correlators and referred to herein as "SAW" correlators.

As in the case of the structures of FIGS. 2 and 7, the received FSK signal is supplied at intermediate frequency level from IF filter 140 through limiter 141 to filters 142 and 156 which are tuned, respectively, to frequencies $f_1$ and $f_2$ in accordance with the frequency response characteristics shown in FIG. 3. Assume that marks and spaces are represented by signal segments of frequencies $f_1$ and $f_2$ as indicated in the waveform of FIG. 1a and that a space is the complement of a mark in that the frequencies $f_1$ and $f_2$ are interchanged, as discussed hereinbefore.

Consider first the upper channel A. The signal segments $f_1$ are passed by filter 142 as bursts of signal of frequency $f_1$, corresponding to the bursts 20, 21 and 22 of FIG. 1a. The SAW correlator 143 is essentially a delay line which will simultaneously retain many code chips of signal, for example 128 code chips, which is a typical length of a mark. As each burst of signal segment is supplied to the SAW correlator 143 and passes therethrough, its phase is cumulatively delayed so that after it has propagated a certain distance through correlator 143, it will have been delayed 360° and will be in phase with a subsequent burst of signal segment of frequency $f_1$ being supplied to the input of SAW correlator 143.

The phase of any given burst of signal segment of frequency $f_1$ can be delayed 360° many times depending upon the length of the SAW correlator 143. A further characteristic of the SAW correlator 143 is that the signal passing therethrough can be tapped at any desired point along the length thereof. Thus, by proper spacing of taps along the length of the delay line which constitutes the SAW correlator 143, it is possible to tap each of the signal segments of a complete pattern passing therethrough at a given instant of time when all of the signal segments are in phase, thereby producing a summation of all such currents on the common output lead 145, which is the collector lead for all of the individual taps mentioned above. Thus, the signal 144 represents the summation of all of the current of the signal segments of frequency $f_1$ within the confines of a single pattern of signal segments representing a mark.

Simultaneously the signal segments of frequency $f_2$ are passed through the filter 156 of lower channel B to SAW correlator 157 which has taps positioned therealong so as to simultaneously intercept the signal segments of frequency $f_2$, and identified by reference characters 23, 24 and 25 of FIG. 1a, to produce the output waveform 160 of frequency $f_2$.

The detectors 147 and 159 detect the signal waveforms 144 and 160, respectively, to produce dc voltage waveforms 149 and 161, which are added together in summer 151 and then supplied to the positive input 153 of difference amplifier 154, whose output terminal 155 is then positive, indicating the reception of a mark.

When a space is received by the system of FIG. 8, which is complementary to the signal segments forming a mark except that the frequencies $f_1$ and $f_2$ are interchanged, the SAW correlator 143 will produce on its output lead 146 a triangular waveform 165 as a result of taps positioned within said SAW correlator 143 to intercept the signal segments 23, 24 and 25 of frequency $f_1$.

Similarly, the SAW correlator 157 of channel B will generate the waveform 166 on its output 170 in response to receiving the signal segments 20, 21 and 22 of frequency $f_2$ when a space is being received.

The two triangular waveforms 165 and 166 of frequencies $f_1$ and $f_2$ are detected by detectors 148 and 158 to produce triangularly shaped dc outputs 167 and 168. Such two dc outputs 167 and 168 are added together in summer 150 to produce a positive output which is inverted by difference amplifier 154 to produce a negative pulse on output terminal 155 thereof, indicating the reception of a space.

For a more detailed discussion of the nature and characteristics of a surface acoustic wave (SAW) device such as the SAW correlators 143 and 157, reference is made to a publication by DeLamar T. Bell et al. appearing on pages 263–271 of the *IEEE Transactions of Microwave Theory Technology*, Vol. MTT-22, April 1973, entitled "Application of Acoustic Surface-Wave Technology to Spread Spectrum Communications."

Other arrangements of detectors, filters and correlators, including other analog or multi-level digital correlators can be employed and would be apparent to one skilled in the art without departing from the spirit or scope of this invention. A principal feature of the invention, as mentioned above, is the use of correlators in each of two channels to enhance the signal-to-noise ratio before the results are ultimately combined in a difference amplifier. Extension to more than two frequencies in non-binary applications is also feasible.

What is claimed is:

1. Means for demodulating a received encoded signal encoded with at least one predetermined pattern of successive signal segments of frequencies $f_1$ and $f_2$, and comprising:

first signal processing means responsive to said encoded signal and comprising first correlation means;

said first correlation means comprising first register means containing a first staticized reference signal having a first pattern of binary 1's and 0's correlative with the signal segments of frequency $f_1$ to produce a first output signal when correlation occurs;

second signal processing means responsive to said encoded signal and comprising second correlation means;

said second correlation means comprising second register means containing a second staticized reference signal having a second pattern of binary 1's and 0's complementary to said first staticized pattern and correlative with the signal segments of frequency $f_2$ to produce a second output signal when correlation occurs; and means for combining said first and second output signals to produce a resultant output signal indicating correlation with said at least one pattern of signal segments.

2. Demodulating means as in claim 1 in which:

said first signal processing means further comprises first filter means responsive to said encoded signal to output said signal segments of frequency $f_1$ to said first correlation means;

in which said second signal processing means further comprises second filter means responsive to said encoded signal to output said signal segments of frequency $f_2$ to said second correlation means.

3. Demodulation means as in claim 1 in which:

said first signal processing means further comprises first detecting means responsive to the output of said first correlation means to produce a first substantially two-level signal in response to said pattern with said first level representing the reception of signal segments of frequency $f_1$ and the second level representing the absence of signal segments of frequency $f_1$; and in which said second signal processing means further comprises second detector means responsive to the output of said second correlation means to produce a second substantially two-level signal in response to said first pattern with said first level representing the reception of signal segments of frequency $f_2$ and said second level representing the absence of signal segments of frequency $f_2$.

4. Demodulating means as in claim 1 in which:

said first signal processing means further comprises first filtering and detecting means responsive to said encoded signal to output to said first correlation means a first substantially two-level signal in response to said pattern with a first level representing the reception of signal segments of frequency $f_1$ and the second level representing the reception of signal segments of frequency $f_2$; and in which said second signal processing means further comprises second filtering and detecting means responsive to said encoded signal to output to said second correlation means a second substantially two-level signal with a first level representing the reception of signal segments of frequency $f_2$ and with the second level representing the reception of signal segments of frequency $f_1$.

5. Means for demodulating an encoded signal comprising first and second predetermined patterns of successive signal segments of frequencies $f_1$ and $f_2$, and comprising:

first signal processing means responsive to said encoded signal and comprising first correlation means;

said first correlation means comprising first and second register means containing first and second staticized reference signals respectively having said first and second patterns of binary 1's and 0's correlative with the signal segments of frequency $f_1$ to produce first and second output signals when correlation occurs;

second signal processing means responsive to said encoded signal and comprising second correlation means;

said second correlation means comprising third and fourth register means containing third and fourth staticized reference signals respectively having said second and first patterns of binary 1's and 0's correlative with the signal segments of frequency $f_2$ to produce third and fourth output signals when correlation occurs; and means for combining said first and third output signals to produce a first resultant output signal indicating correlation with said first pattern of signal segments and for combining said second and fourth output signals to produce a second resultant signal indicating correlation with said second pattern of signal segments.

6. Demodulation means as in claim 5 in which:
said first signal processing means further comprises first filter means responsive to said encoded signal to pass said signal segments of frequency $f_1$ to said first correlation means; and
in which said second signal processing means further comprises second filter means responsive to said encoded signal to pass said signal segments of frequency $f_2$ to said second correlation means.

7. Demodulating means as in claim 5 in which:
said first signal processing means further comprises first filtering means and detecting means responsive to said encoded signal to output to said first correlation means first and second substantially two-level signals in response to said first and second patterns with a first level representing the reception of signal segments of frequency $f_1$ and the second level representing the reception of signal segments of frequency $f_2$; and
in which said second signal processing means further comprises second filtering means and detecting means responsive to said encoded signal to output to said second correlation means third and fourth substantially two-level signals with a first level representing the reception of signal segments of frequency $f_2$ and with the second level representing the reception of signal segments of frequency $f_1$.

* * * * *